(12) United States Patent
Johnsen et al.

(10) Patent No.: US 9,935,848 B2
(45) Date of Patent: Apr. 3, 2018

(54) SYSTEM AND METHOD FOR SUPPORTING SUBNET MANAGER (SM) LEVEL ROBUST HANDLING OF UNKOWN MANAGEMENT KEY IN AN INFINIBAND (IB) NETWORK

(75) Inventors: Bjorn-Dag Johnsen, Oslo (NO); Line Holen, Fetsund (NO); Dag Georg Moxnes, Oslo (NO)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 13/488,192

(22) Filed: Jun. 4, 2012

(65) Prior Publication Data

US 2012/0311124 A1 Dec. 6, 2012

Related U.S. Application Data

(60) Provisional application No. 61/493,330, filed on Jun. 3, 2011, provisional application No. 61/645,517, filed on May 10, 2012.

(51) Int. Cl.
*H04L 12/24* (2006.01)
*H04L 29/06* (2006.01)

(52) U.S. Cl.
CPC .............. *H04L 41/28* (2013.01); *H04L 41/32* (2013.01); *H04L 63/083* (2013.01)

(58) Field of Classification Search
CPC . H04L 9/3234; H04L 63/0876; H04L 63/083; H04L 63/0442; H04L 9/3271
See application file for complete search history.

(56) References Cited

U.S. PATENT DOCUMENTS

| | | |
|---|---|---|
| 5,758,083 A | 5/1998 | Singh |
| 5,805,805 A | 9/1998 | Civanlar et al. |
| 5,964,837 A | 10/1999 | Chao |
| 6,012,100 A | 1/2000 | Frailong |
| 6,014,669 A | 1/2000 | Slaughter |
| 6,091,706 A | 7/2000 | Shaffer |

(Continued)

FOREIGN PATENT DOCUMENTS

| | | |
|---|---|---|
| CN | 1520556 | 8/2004 |
| CN | 1536842 | 10/2004 |

(Continued)

OTHER PUBLICATIONS

Tom Shanley, Infiniband Network Architecture (excerpt), Pearson Education, published 2002, p. 209-211, 393-394, 551, 554.*

(Continued)

*Primary Examiner* — Douglas Blair
*Assistant Examiner* — Joseph M Cousins
(74) *Attorney, Agent, or Firm* — Tucker Ellis LLP

(57) ABSTRACT

A system and method can support subnet manager (SM) level robust handling of an incoming unknown management key in an InfiniBand (IB) network. A local SM in a fabric is adaptive to receive an incoming subnet management packet (SMP) from a remote SM, wherein the SMP contains a first management key. Furthermore, the local SM operates to check whether the first management key is consistent with a configuration associated with the local SM, and can silently drop the incoming SMP if the first management key is not consistent with the local SM configuration.

15 Claims, 3 Drawing Sheets

(56) References Cited

U.S. PATENT DOCUMENTS

| | | | |
|---|---|---|---|
| 6,098,098 A | 8/2000 | Sandahl | |
| 6,202,067 B1 | 3/2001 | Blood | |
| 6,282,678 B1 | 8/2001 | Snay | |
| 6,286,038 B1 | 9/2001 | Reichmeyer | |
| 6,314,531 B1 | 11/2001 | Kram | |
| 6,343,320 B1 | 1/2002 | Fairchild | |
| 6,463,470 B1 | 10/2002 | Mohaban | |
| 6,594,759 B1 | 7/2003 | Wang | |
| 6,647,419 B1 | 11/2003 | Mogul | |
| 6,658,579 B1 | 12/2003 | Bell | |
| 6,678,835 B1 | 1/2004 | Shah | |
| 6,697,360 B1 | 2/2004 | Gai | |
| 6,748,429 B1 | 6/2004 | Talluri et al. | |
| 6,772,320 B1 | 8/2004 | Raj | |
| 6,829,685 B2 | 12/2004 | Neal | |
| 6,904,545 B1 | 6/2005 | Erimli | |
| 6,941,350 B1 | 9/2005 | Frazier et al. | |
| 6,963,932 B2 | 11/2005 | Bhat | |
| 6,978,300 B1 | 12/2005 | Beukema et al. | |
| 6,981,025 B1* | 12/2005 | Frazier et al. | 709/209 |
| 6,985,956 B2 | 1/2006 | Luke et al. | |
| 7,023,795 B1 | 4/2006 | Hwu | |
| 7,023,811 B2 | 4/2006 | Pinto | |
| 7,069,468 B1 | 6/2006 | Olson | |
| 7,113,995 B1 | 9/2006 | Beukema | |
| 7,185,025 B2 | 2/2007 | Rosenstock et al. | |
| 7,194,540 B2 | 3/2007 | Aggarwal | |
| 7,200,704 B2 | 4/2007 | Njoku et al. | |
| 7,216,163 B2 | 5/2007 | Sinn | |
| 7,221,676 B2 | 5/2007 | Green | |
| 7,231,518 B1 | 6/2007 | Bakke | |
| 7,290,277 B1 | 10/2007 | Chou et al. | |
| 7,302,484 B1 | 11/2007 | Stapp | |
| 7,356,841 B2 | 4/2008 | Wilson et al. | |
| 7,398,394 B1 | 7/2008 | Johnsen et al. | |
| 7,409,432 B1 | 8/2008 | Recio et al. | |
| 7,437,447 B2 | 10/2008 | Brey et al. | |
| 7,493,409 B2 | 2/2009 | Craddock et al. | |
| 7,500,236 B2 | 3/2009 | Janzen | |
| 7,548,545 B1 | 6/2009 | Wittenschlaeger | |
| 7,577,996 B1 | 8/2009 | Merchant | |
| 7,633,955 B1 | 12/2009 | Saraiya et al. | |
| 7,634,608 B2 | 12/2009 | Droux et al. | |
| 7,636,772 B1 | 12/2009 | Kirby | |
| 7,653,668 B1 | 1/2010 | Shelat | |
| 7,685,385 B1 | 3/2010 | Choudhary et al. | |
| 7,724,748 B2 | 5/2010 | Davis | |
| 7,783,788 B1 | 8/2010 | Quinn | |
| 7,843,822 B1 | 11/2010 | Paul et al. | |
| 7,853,565 B1 | 12/2010 | Liskov | |
| 7,860,961 B1 | 12/2010 | Finkelstein et al. | |
| 7,873,711 B2 | 1/2011 | Adams et al. | |
| 7,953,890 B1 | 5/2011 | Katkar | |
| 8,184,555 B1 | 5/2012 | Mouton | |
| 8,214,558 B1 | 7/2012 | Sokolov | |
| 8,214,653 B1 | 7/2012 | Marr | |
| 8,234,407 B2 | 7/2012 | Sugumar | |
| 8,291,148 B1 | 10/2012 | Shah et al. | |
| 8,327,437 B2 | 12/2012 | McAlister | |
| 8,331,381 B2 | 12/2012 | Brown et al. | |
| 8,335,915 B2 | 12/2012 | Plotkin et al. | |
| 8,423,780 B2 | 4/2013 | Plotkin et al. | |
| 8,549,281 B2 | 10/2013 | Samovskiy et al. | |
| 8,583,921 B1 | 11/2013 | Shu | |
| 8,635,318 B1 | 1/2014 | Shankar | |
| 8,769,152 B2 | 7/2014 | Gentieu | |
| 8,924,952 B1 | 12/2014 | Hou | |
| 8,935,206 B2 | 1/2015 | Aguilera | |
| 8,935,333 B2 | 1/2015 | Beukema | |
| 8,972,966 B2 | 3/2015 | Kelso | |
| 2002/0059597 A1 | 5/2002 | Kikinis et al. | |
| 2002/0120720 A1 | 8/2002 | Moir | |
| 2002/0133620 A1 | 9/2002 | Krause | |
| 2002/0143914 A1 | 10/2002 | Cihula | |
| 2002/0188711 A1 | 12/2002 | Meyer | |
| 2002/0198755 A1 | 12/2002 | Birkner | |
| 2003/0009487 A1 | 1/2003 | Prabakaran et al. | |
| 2003/0009551 A1 | 1/2003 | Benfield | |
| 2003/0033427 A1 | 2/2003 | Brahmaroutu | |
| 2003/0065775 A1 | 4/2003 | Aggarwal | |
| 2003/0079040 A1 | 4/2003 | Jain | |
| 2003/0093509 A1 | 5/2003 | Li et al. | |
| 2003/0105903 A1 | 6/2003 | Garnett et al. | |
| 2003/0105914 A1 | 6/2003 | Dearth et al. | |
| 2003/0115276 A1 | 6/2003 | Flaherty | |
| 2003/0120852 A1 | 6/2003 | McConnell et al. | |
| 2003/0208572 A1 | 11/2003 | Shah et al. | |
| 2004/0022245 A1 | 2/2004 | Forbes | |
| 2004/0031052 A1 | 2/2004 | Wannamaker | |
| 2004/0068501 A1 | 4/2004 | McGoveran | |
| 2004/0090925 A1 | 5/2004 | Schoeberl | |
| 2004/0103282 A1 | 5/2004 | Meier et al. | |
| 2004/0139083 A1 | 7/2004 | Hahn | |
| 2004/0153849 A1 | 8/2004 | Tucker et al. | |
| 2004/0162973 A1 | 8/2004 | Rothman | |
| 2004/0193768 A1 | 9/2004 | Carnevale | |
| 2004/0199764 A1 | 10/2004 | Koechling et al. | |
| 2004/0220947 A1 | 11/2004 | Amen | |
| 2004/0249928 A1 | 12/2004 | Jacobs et al. | |
| 2004/0255286 A1 | 12/2004 | Rothman | |
| 2005/0025520 A1 | 2/2005 | Murakami | |
| 2005/0044363 A1 | 2/2005 | Zimmer et al. | |
| 2005/0071382 A1 | 3/2005 | Rosenstock | |
| 2005/0071709 A1 | 3/2005 | Rosenstock et al. | |
| 2005/0086342 A1 | 4/2005 | Burt | |
| 2005/0091396 A1 | 4/2005 | Nilakantan et al. | |
| 2005/0105554 A1 | 5/2005 | Kagan et al. | |
| 2005/0125520 A1 | 6/2005 | Hanson | |
| 2005/0182701 A1 | 8/2005 | Cheston | |
| 2005/0182831 A1 | 8/2005 | Uchida | |
| 2005/0182853 A1 | 8/2005 | Lewites et al. | |
| 2005/0198164 A1 | 9/2005 | Moore et al. | |
| 2005/0198250 A1 | 9/2005 | Wang | |
| 2005/0213608 A1* | 9/2005 | Modi | H04L 41/0803 370/468 |
| 2005/0273641 A1 | 12/2005 | Sandven et al. | |
| 2006/0079278 A1 | 4/2006 | Ferguson et al. | |
| 2006/0112297 A1 | 5/2006 | Davidson | |
| 2006/0114863 A1 | 6/2006 | Sanzgiri | |
| 2006/0117103 A1 | 6/2006 | Brey | |
| 2006/0136735 A1 | 6/2006 | Plotkin | |
| 2006/0168192 A1 | 7/2006 | Sharma | |
| 2006/0177103 A1 | 8/2006 | Hildreth | |
| 2006/0195560 A1 | 8/2006 | Newport | |
| 2006/0215673 A1 | 9/2006 | Olvera-Hernandez | |
| 2006/0221975 A1 | 10/2006 | Lo | |
| 2006/0233168 A1 | 10/2006 | Lewites | |
| 2007/0016694 A1 | 1/2007 | Achler | |
| 2007/0038703 A1 | 2/2007 | Tendjoukian | |
| 2007/0050763 A1 | 3/2007 | Kagan | |
| 2007/0058657 A1 | 3/2007 | Holt | |
| 2007/0110245 A1 | 5/2007 | Sood | |
| 2007/0129917 A1 | 6/2007 | Blevins | |
| 2007/0162520 A1 | 7/2007 | Petersen et al. | |
| 2007/0180497 A1 | 8/2007 | Popescu | |
| 2007/0195774 A1 | 8/2007 | Sherman | |
| 2007/0195794 A1 | 8/2007 | Fujita | |
| 2007/0198656 A1 | 8/2007 | Mazzaferri et al. | |
| 2007/0206735 A1 | 9/2007 | Silver et al. | |
| 2007/0253328 A1 | 11/2007 | Harper | |
| 2008/0031266 A1 | 2/2008 | Tallet et al. | |
| 2008/0137528 A1 | 6/2008 | O'Toole | |
| 2008/0144614 A1 | 6/2008 | Fisher et al. | |
| 2008/0159277 A1 | 7/2008 | Vobbilisetty | |
| 2008/0183853 A1 | 7/2008 | Manion et al. | |
| 2008/0184332 A1* | 7/2008 | Gerkis | H04L 63/101 726/1 |
| 2008/0192750 A1 | 8/2008 | Ko | |
| 2008/0201486 A1 | 8/2008 | Hsu | |
| 2008/0209018 A1 | 8/2008 | Hernandez | |
| 2008/0229096 A1 | 9/2008 | Alroy et al. | |
| 2008/0250125 A1 | 10/2008 | Brey et al. | |
| 2008/0288646 A1 | 11/2008 | Hasha | |
| 2008/0301256 A1 | 12/2008 | McWilliams | |

(56) References Cited

U.S. PATENT DOCUMENTS

| | | |
|---|---|---|
| 2008/0310421 A1 | 12/2008 | Teisberg |
| 2008/0310422 A1 | 12/2008 | Booth |
| 2009/0049164 A1 | 2/2009 | Mizuno |
| 2009/0116404 A1 | 5/2009 | Mahop |
| 2009/0141728 A1 | 6/2009 | Brown |
| 2009/0178033 A1 | 7/2009 | Challener |
| 2009/0216853 A1 | 8/2009 | Burrow |
| 2009/0249472 A1 | 10/2009 | Litvin |
| 2009/0271472 A1 | 10/2009 | Scheifler |
| 2009/0307499 A1 | 12/2009 | Senda |
| 2009/0327462 A1 | 12/2009 | Adams et al. |
| 2010/0014526 A1 | 1/2010 | Chavan |
| 2010/0020806 A1 | 1/2010 | Vandat |
| 2010/0080117 A1 | 4/2010 | Coronado et al. |
| 2010/0082853 A1 | 4/2010 | Block |
| 2010/0114826 A1 | 5/2010 | Voutilainen |
| 2010/0138532 A1 | 6/2010 | Glaeser et al. |
| 2010/0142544 A1 | 6/2010 | Chapel et al. |
| 2010/0166167 A1 | 7/2010 | Karimi-Cherkandi et al. |
| 2010/0228961 A1 | 9/2010 | Burns |
| 2010/0235488 A1 | 9/2010 | Sharma |
| 2010/0268857 A1 | 10/2010 | Bauman |
| 2010/0306772 A1 | 12/2010 | Arnold et al. |
| 2011/0022574 A1 | 1/2011 | Hansen |
| 2011/0072206 A1 | 3/2011 | Ross et al. |
| 2011/0110366 A1 | 5/2011 | Moore et al. |
| 2011/0138082 A1 | 6/2011 | Khatri |
| 2011/0138185 A1 | 6/2011 | Ju |
| 2011/0173302 A1 | 7/2011 | Rider |
| 2011/0179195 A1 | 7/2011 | O'Mullan |
| 2011/0209202 A1 | 8/2011 | Otranen |
| 2011/0222492 A1 | 9/2011 | Borsella et al. |
| 2011/0264577 A1 | 10/2011 | Winbom |
| 2011/0283017 A1 | 11/2011 | Alkhatib |
| 2011/0307886 A1 | 12/2011 | Thanga |
| 2012/0005480 A1 | 1/2012 | Batke |
| 2012/0039331 A1 | 2/2012 | Astigarraga et al. |
| 2012/0195417 A1 | 8/2012 | Hua et al. |
| 2012/0239928 A1 | 9/2012 | Judell |
| 2012/0290698 A1 | 11/2012 | Alroy et al. |
| 2013/0036136 A1 | 2/2013 | Horii |
| 2013/0041969 A1 | 2/2013 | Falco |
| 2013/0046904 A1 | 2/2013 | Hilland |
| 2013/0138836 A1 | 5/2013 | Cohen et al. |
| 2013/0159865 A1 | 6/2013 | Smith et al. |
| 2013/0179870 A1 | 7/2013 | Kelso |
| 2013/0191622 A1 | 7/2013 | Sasaki |
| 2014/0095853 A1 | 4/2014 | Sarangshar |
| 2014/0095876 A1 | 4/2014 | Smith |

FOREIGN PATENT DOCUMENTS

| | | |
|---|---|---|
| CN | 1567827 | 1/2005 |
| CN | 1617526 | 5/2005 |
| CN | 1728664 | 2/2006 |
| CN | 101123498 A | 2/2008 |
| EP | 2 051 436 A1 | 4/2009 |
| EP | 2160068 A1 | 3/2010 |
| JP | 2002247089 | 8/2002 |
| JP | 2004166263 | 6/2004 |
| JP | 2005522774 | 7/2005 |
| JP | 2006157285 | 6/2006 |
| JP | 2007501563 | 1/2007 |
| JP | 200854214 | 3/2008 |
| JP | 2009510953 | 3/2009 |
| WO | 01/90838 A2 | 11/2001 |
| WO | 2006016698 | 2/2006 |
| WO | 2008099479 | 8/2008 |
| WO | 2012037518 | 3/2012 |

OTHER PUBLICATIONS

Tom Shanley, Infiniband Network Architecture (excerpt), Pearson Education, published 2002, p. 204-209, 560-564.*
Tom Shanley, Infiniband Network Architecture (excerpt), Pearson Education, published 2002, p. 213.*
Tom Shanley, Infiniband Network Architecture (excerpt), Pearson Education, published 2002, p. 86-87.*
Lee, M., Security Enhancement in Infiniband Architecture, IEEE, vol. 19, Apr. 2005, pp. 1-18.
Aurelio Bermudez, On the InfiniBand Subnet Discovery Process, IEEE The Computer Society 2003, pp. 1-6.
Tom Shanley, Infiniband Network Architecture, Pearson Education 2002, p. 559, 561.
European Patent Office, International Searching Authority, International Search Report and Written Opinion dated Sep. 12, 2012 for Application No. PCT/US2012/040775, 13 pages.
Tom Shanley, Infiniband Network Architecture (excerpt), chapter—Detailed Description of the Link Layer, Pearson Education, published 2002, p. 390-392, 485, 491-493, 537-539.
International Search Report dated Sep. 23, 2013 for Application No. PCT/US2013/040639, 10 pages.
International Search Report dated Sep. 26, 2013 for Application No. PCT/US2013/040656, 10 pages.
InfiniBand$^{SM}$ Trade Association, InfiniBand™ Architecture Specification, vol. 1, Release 1.2.1, Nov. 2007, pp. 1-1727.
Shanley, Infiniband Network Architecture, Oct. 2002, pp. 387-394, Pearson Education.
State Intellectual Property Office of the People's Republic of China, Search Report for Chinese Patent Application No. 201180039807.0, Jun. 3, 2015, 2 pages.
State Intellectual Property Office of the People's Republic of China, Search Report for Chinese Patent Application No. 201180040064.9, May 29, 2015, 1 page.
Shanley, et al., Infiniband Network Architecture, Oct. 2002, pp. 83-87, 95-101, 205-208, 403-406, Pearson Education.
Kashyap, RFC 4392: IP over InfiniBand Architecture, Apr. 2006, pp. 1-22.
State Intellectual Property Office of the People's Republic of China, Search Report for Chinese Patent Application No. 201180039850.7, May 5, 2015, 2 pages.
United States Patent and Trademark Office, Office Action dated Apr. 8, 2016 for U.S. Appl. No. 13/235,161, 24 Pages.
United States Patent and Trademark Office, Office Action dated Apr. 8, 2016 for U.S. Appl. No. 13/235,130, 32 Pages.
State Intellectual Property Office of the People's Republic of China, Search Report for Chinese Patent Application No. 201280027279.1, Office Action dated Sep. 9, 2015, 2 pages.
State Intellectual Property Office of the People's Republic of China, Search Report, Office Action dated Jun. 1, 2016 for Chinese Patent Application No. 201380014177.0, 8 Pages.
Tom Shanley, Infiniband Network Architecture, Pearson Education, Published Oct. 2002, pp. 8-9, 391-396, 549-551.
United States Patent and Trademark Office, Office Action dated Jun. 15, 2017 for U.S. Appl. No. 13/488,113, 22 Pages.
Shanley, Tom "Infiniband Network Architecture" Copyright 2002 by Mindshare, Inc., ISBN: 0-321-11765-4, pp. 117-123 and 629-633.
United States Patent and Trademark Office, Office Action dated Apr. 18, 2017 for U.S. Appl. No. 13/235,113, 30 Pages.
Ching-Min Lin et al., "A New Quorum-Based Scheme for Managing Replicated Data in Distributed Systems" IEEE Transactions on Computers, vol. 51, No. 12, Dec. 2002, 6 Pages.
United States Patent and Trademark Office, Office Action dated Nov. 16, 2017 for U.S. Appl. No. 13/235,113, 28 Pages.
United States Patent and Trademark Office, Office Communication dated Nov. 30, 2017 for U.S. Appl. No. 13/235,130, 3 Pages.

\* cited by examiner

SYSTEM AND METHOD FOR SUPPORTING SUBNET MANAGER (SM) LEVEL ROBUST HANDLING OF UNKOWN MANAGEMENT KEY IN AN INFINIBAND (IB) NETWORK

CLAIM OF PRIORITY

This application claims the benefit of priority on U.S. Provisional Patent Application No. 61/493,330, entitled "STATEFUL SUBNET MANAGER FAILOVER IN A MIDDLEWARE MACHINE ENVIRONMENT" filed Jun. 3, 2011, and U.S. Provisional Patent Application No. 61/645,517, entitled "SYSTEM AND METHOD FOR PROVIDING SECRET MANAGEMENT KEY IN A MIDDLEWARE MACHINE ENVIRONMENT" filed May 10, 2012, which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

This application is related to the following patent applications, which is hereby incorporated by reference in its entirety:

U.S. patent application Ser. No. 13/487,973, titled "SYSTEM AND METHOD FOR PROVIDING SECURE SUBNET MANAGEMENT AGENT (SMA) IN AN INFINIBAND (IB) NETWORK", inventors Bjørn-Dag Johnsen, et al., filed on Jun. 4, 2012.

U.S. patent application Ser. No. 13/488,040titled "SYSTEM AND METHOD FOR AUTHENTICATING IDENTITY OF DISCOVERED COMPONENT IN AN INFINIBAND (IB) NETWORK", inventors Bjørn-Dag Johnsen, et al., filed on Jun. 4, 2012, which is now U.S. Pat. No. 9,240,981, issued on Jan. 19, 2016.

U.S. patent application Ser. No. 13/488,161, titled "SYSTEM AND METHOD FOR PROVIDING RESTRICTIONS ON THE LOCATION OF PEER SUBNET MANAGER (SM) INSTANCES IN AN INFINIBAND (IB) NETWORK", inventors Bjørn-Dag Johnsen, etal., filed on Jun. 4, 2012, which is now U.S. Pat. No. 8,713,649, issued on Apr. 29, 2014.

FIELD OF INVENTION

The present invention is generally related to computer systems, and is particularly related to supporting an InfiniBand (IB) network.

BACKGROUND

The interconnection network plays a beneficial role in the next generation of super computers, clusters, and data centers. High performance network technology, such as the InfiniBand (IB) technology, is replacing proprietary or low-performance solutions in the high performance computing domain, where high bandwidth and low latency are the key requirements. For example, IB installations are used in supercomputers such as Los Alamos National Laboratory's Roadrunner, Texas Advanced Computing Center's Ranger, and Forschungszentrum Juelich's JuRoPa.

IB was first standardized in October 2000 as a merge of two older technologies called Future I/O and Next Generation I/O. Due to its low latency, high bandwidth, and efficient utilization of host-side processing resources, it has been gaining acceptance within the High Performance Computing (HPC) community as a solution to build large and scalable computer clusters. The de facto system software for IB is OpenFabrics Enterprise Distribution (OFED), which is developed by dedicated professionals and maintained by the OpenFabrics Alliance. OFED is open source and is available for both GNU/Linux and Microsoft Windows.

SUMMARY

Described herein is a system and method that can support subnet manager (SM) level robust handling of an incoming unknown management key in an InfiniBand (IB) network. A local SM in a fabric is adaptive to receive an incoming subnet management packet (SMP) from a remote SM, wherein the SMP contains a first management key. Furthermore, the local SM operates to check whether the first management key is consistent with a configuration associated with the local SM, and can silently drop the incoming SMP if the first management key is not consistent with the local SM configuration.

DETAILED DESCRIPTION

Described herein is a system and method that can support subnet manager (SM) level robust handling of unknown management key in an interconnected network, such as an InfiniBand (IB) network.

Figure 1:
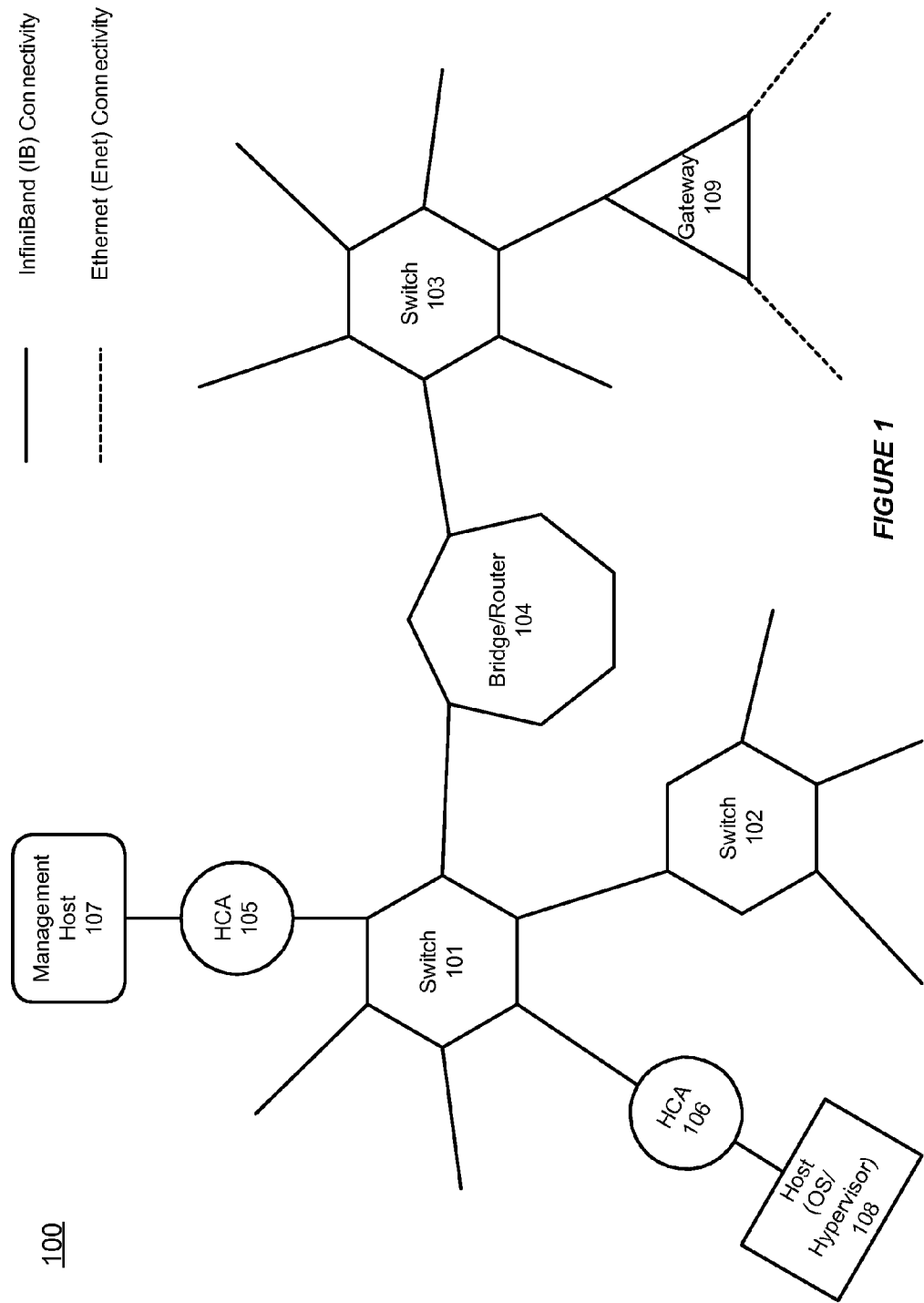
FIG. 1 shows an illustration of a fabric model in a middleware environment in accordance with an embodiment of the invention.

FIG. 1 shows an illustration of a fabric model in a middleware environment in accordance with an embodiment of the invention. As shown in FIG. 1, an interconnected network, or a fabric 100, can include switches 101-103, bridges and routers 104, host channel adapters (HCAs) 105-106 and designated management hosts 107. Additionally, the fabric can include, or be connected to, one or more hosts 108 that are not designated management hosts.

The designated management hosts 107 can be installed with HCAs 105-106, a network software stack and relevant management software in order to perform network management tasks. Furthermore, firmware and management software can be deployed on the switches 101-103, and the bridges and routers 104 to direct traffic flow in the fabric. Here, the host HCA drivers, OS and Hypervisors on hosts 108 that are not designated management hosts may be considered outside the scope of the fabric from a management perspective.

The fabric 100 can be in a single media type, e.g. an IB only fabric, and be fully connected. The physical connectivity in the fabric ensures in-band connectivity between any fabric components in the non-degraded scenarios. Alternatively, the fabric can be configured to include Ethernet (Enet) connectivity outside gateway (GW) external ports on a gateway 109. Additionally, it is also possible to have independent fabrics operating in parallel as part of a larger system. For example, the different fabrics can be only indirectly connected via different HCAs or HCA ports.

InfiniBand (IB) Architecture

IB architecture is a serial point-to-point technology. Each of the IB networks, or subnets, can include a set of hosts interconnected using switches and point-to-point links. A single subnet can be scalable to more than ten-thousand nodes and two or more subnets can be interconnected using an IB router. The hosts and switches within a subnet are addressed using local identifiers (LIDs), e.g. a single subnet may be limited to 49151 unicast addresses.

An IB subnet can employ at least one subnet manager (SM) which is responsible for initializing and starting up the sub-net including the configuration of all the IB ports residing on switches, routers and host channel adapters (HCAs) in the subset. The SM's responsibility also includes routing table calculation and deployment. Routing of the network aims at obtaining full connectivity, deadlock freedom, and load balancing between all source and destination pairs. Routing tables can be calculated at network initialization time and this process can be repeated whenever the topology changes in order to update the routing tables and ensure optimal performance.

At the time of initialization, the SM starts in the discovering phase where the SM does a sweep of the network in order to discover all switches and hosts. During the discovering phase, the SM may also discover any other SMs present and negotiate who should be the master SM. When the discovering phase is completed, the SM can enter a master phase. In the master phase, the SM proceeds with LID assignment, switch configuration, routing table calculations and deployment, and port configuration. At this point, the subnet is up and ready to use.

After the subnet is configured, the SM can monitor the network for changes (e.g. a link goes down, a device is added, or a link is removed). If a change is detected during the monitoring process, a message (e.g. a trap) can be forwarded to the SM and the SM can reconfigure the network. Part of the reconfiguration process, or a heavy sweep process, is the rerouting of the network which can be performed in order to guarantee full connectivity, deadlock freedom, and proper load balancing between all source and destination pairs.

The HCAs in an IB network can communicate with each other using queue pairs (QPs). A QP is created during the communication setup, and a set of initial attributes such as QP number, HCA port, destination LID, queue sizes, and transport service are supplied. On the other hand, the QP associated with the HCAs in a communication is destroyed when the communication is over. An HCA can handle many QPs, each QP consists of a pair of queues, a send queue (SQ) and a receive queue (RQ). There is one such pair present at each end-node that is participating in the communication. The send queue holds work requests to be transferred to the remote node, while the receive queue holds information on what to do with the data received from the remote node. In addition to the QPs, each HCA can have one or more completion queues (CQs) that are associated with a set of send and receive queues. The CQ holds completion notifications for the work requests posted to the send and receive queue.

The IB architecture is a flexible architecture. Configuring and maintaining an IB subnet can be carried out via special in-band subnet management packets (SMPs). The functionalities of a SM can, in principle, be implemented from any node in the IB subnet. Each end-port in the IB subnet can have an associated subnet management agent (SMA) that is responsible for handling SMP based request packets that are directed to it. In the IB architecture, a same port can represent a SM instance or other software component that uses SMP based communication. Thus, only a well defined sub-set of SMP operations can be handled by the SMA.

SMPs use dedicated packet buffer resources in the fabric, e.g. a special virtual lane (VL15) that is not flow-controlled (i.e. SMP packets may be dropped in the case of buffer overflow. Also, SMPs can use either the routing that the SM sets up based on end-port local Identifiers (LIDs), or SMPs can use direct routes where the route is fully defined by the sender and embedded in the packet. Using direct routes, the packet's path goes through the fabric in terms of an ordered sequence of port numbers on HCAs and switches.

The SM can monitor the network for changes using SMAs that are presented in every switch and/or every HCA. The SMAs communicate changes, such as new connections, disconnections, and port state change, to the SM using traps and notices. A trap is a message sent to alert end-nodes about a certain event. A trap can contain a notice attribute with the details describing the event. Different traps can be defined for different events. In order to reduce the unnecessary distribution of traps, IB applies an event forwarding mechanism where end-nodes are required to explicitly subscribe to the traps they want to be informed about.

The subnet administrator (SA) is a subnet database associated with the master SM to store different information about a subnet. The communication with the SA can help the end-node to establish a QP by sending a general service management datagram (MAD) through a designated QP, .e.g. QP1. Both sender and receiver require information such as source/destination LIDs, service level (SL), maximum transmission unit (MTU), etc. to establish communication via a QP. This information can be retrieved from a data structure known as a path record that is provided by the SA. In order to obtain a path record, the end-node can perform a path record query to the SA, e.g. using the SubnAdmGet/SubnAdmGetable operation. Then, the SA can return the requested path records to the end-node.

The IB architecture provides partitions as a way to define which IB end-ports should be allowed to communicate with other IB end-ports. Partitioning is defined for all non-SMP packets on the IB fabric. The use of partitions other than the default partition is optional. The partition of a packet can be defined by a 16 bit P_Key that consists of a 15 bit partition number and a single bit member type (full or limited).

The partition membership of a host port, or an HCA port, can be based on the premise that the SM sets up the P_Key table of the port with P_Key values that corresponds to the current partition membership policy for that host. In order to compensate for the possibility that the host may not be fully trusted, the IB architecture also defines that switch ports can optionally be set up to do partition enforcement. Hence, the P_Key tables of switch ports that connect to host ports can then be set up to reflect the same partitions as the host port is supposed to be a member of (i.e. in essence equivalent to switch enforced VLAN control in Ethernet LANs).

Since the IB architecture allows full in-band configuration and maintenance of an IB subnet via SMPs, the SMPs themselves are not subject to any partition membership restrictions. Thus, in order to avoid the possibility that any rough or compromised node on the IB fabric is able to define an arbitrary fabric configuration (including partition membership), other protection mechanisms are needed.

M_Keys can be used as the basic protection/security mechanism in the IB architecture for SMP access. An M_Key is a 64 bit value that can be associated individually with each individual node in the IB subnet, and where incoming SMP operations may be accepted or rejected by the target node depending on whether the SMP includes the correct M_Key value (i.e. unlike P_Keys, the ability to specify the correct M_Key value—like a password—represents the access control).

By using an out-of-band method for defining M_Keys associated with switches, it is possible to ensure that no host node is able to set up any switch configuration, including partition membership for the local switch port. Thus, an M_Key value is defined when the switch IB links becomes operational. Hence, as long as the M_Key value is not compromised or "guessed" and the switch out-of-band access is secure and restricted to authorized fabric administrators, the fabric is secure.

Furthermore, the M_Key enforcement policy can be set up to allow read-only SMP access for all local state information except the current M_Key value. Thus, it is possible to protect the switch based fabric from un-authorized (re-) configuration, and still allow host based tools to perform discovery and diagnostic operations.

The flexibility provided by the IB architecture allows the administrators of IB fabrics/subnets, e.g. HPC clusters, to decide whether to use embedded SM instances on one or more switches in the fabric and/or set up one or more hosts on the IB fabric to perform the SM function. Also, since the wire protocol defined by the SMPs used by the SMs is available through APIs, different tools and commands can be implemented based on use of such SMPs for discovery, diagnostics and are controlled independently of any current Subnet Manager operation.

From a security perspective, the flexibility of IB architecture indicates that there is no fundamental difference between root access to the various hosts connected to the IB fabric and the root access allowing access to the IB fabric configuration. This is fine for systems that are physically secure and stable. However, this can be problematic for system configurations where different hosts on the IB fabric are controlled by different system administrators, and where such hosts should be logically isolated from each other on the IB fabric.

SM Level Robust Handling of Incoming Unknown Management Key

Figure 2:
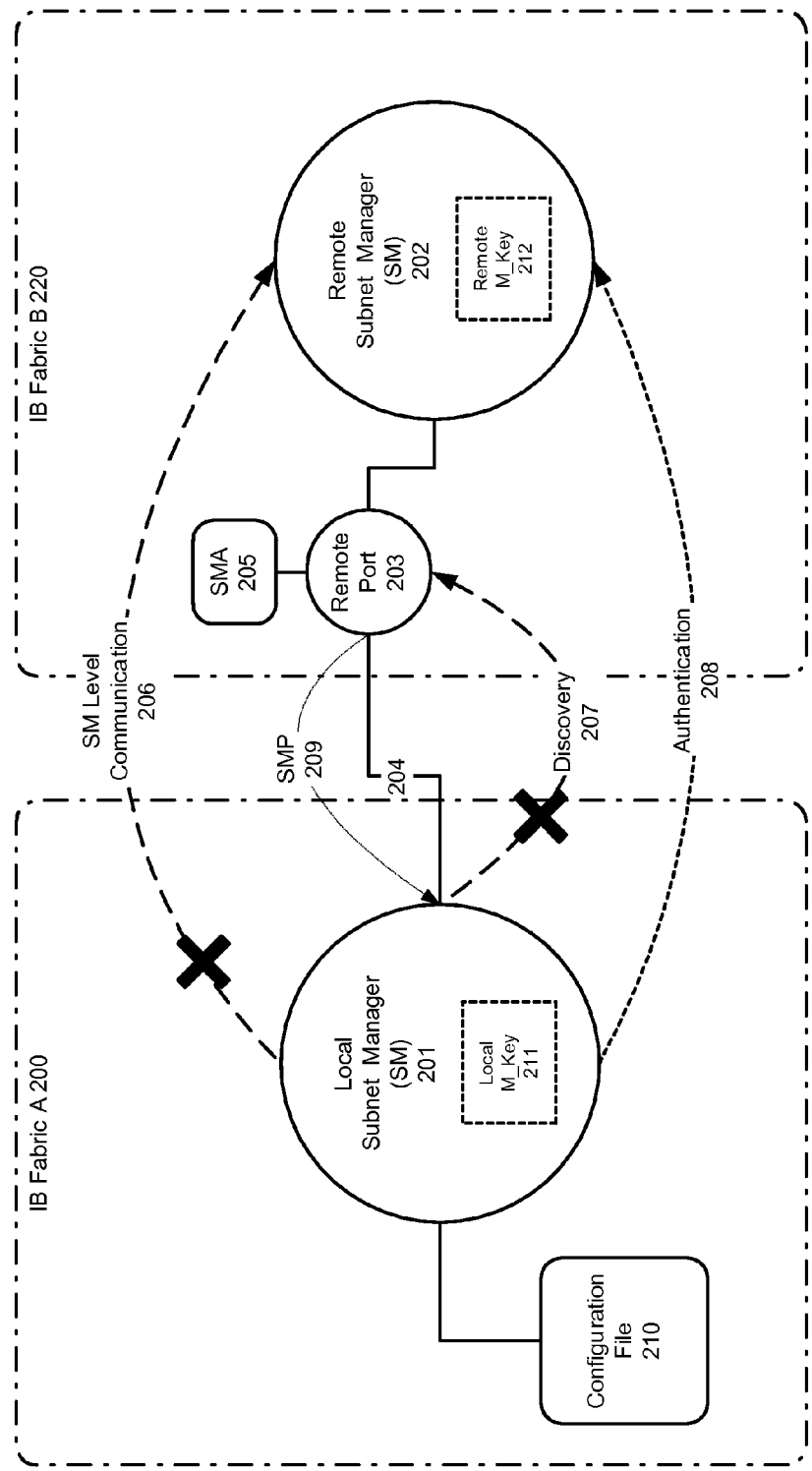
FIG. 2 shows an illustration of supporting SM level robust handling of incoming unknown management key in an IB network in accordance with an embodiment of the invention.

FIG. 2 shows an illustration of supporting SM level robust handling of an incoming unknown management key in an IB network in accordance with an embodiment of the invention. As shown in FIG. 2, a local SM 201 in an IB fabric 200, which is associated with a local M_Key 211, can discover or can be connected to a remote port 203 that is associated with a remote SM 202. The remote SM 202, which is behind the remote port 203, may initiate communication with the local SM 201, e.g. using either a direct route SMP or LID route SMP 209. Here, this SMP 209 can contain a management key, e.g. M_Key 212, associated with the remote SM 202.

After the local SM 201 receives the SMP 209 from the remote SM 202, the local SM 201 can check whether the M_Key 212 is consistent with a configuration associated with the local SM. The local SM 201 can compare the M_Key 212 with a known M_Key list, e.g. stored in a configuration file 210. Then, the local SM 201 can silently drop the incoming SMP 209 if the first management key is not consistent with the local SM configuration.

By silently dropping the incoming SM-SM SMP 209, the local SM 201 can ignore the SM-level communication attempts that can be potentially harmful and thereby may not engage in any un-intended (un-desired) mastership negotiation, nor expose any private credential, e.g. the local SM_Key or M_Key 212, to any un-authorized party.

Furthermore, the local SM 201 can be prevented from trying to initiate SM level communication 206 with an unknown or un-authorized SM instance, based on additional features such as the graceful M_Key handling (e.g. handling of accidental connectivity) and peer SM location restrictions (e.g. based on authentication 208). Also, the local SM 201 can be prevented from performing further discovery beyond the link 204 to the remote SM 212. The local SM 201 can ignore one or more links 204 representing remote ports 203 that may not be configured from the local SM 201.

Additionally, the local SM 201 can be configured in an M_Key read-protect mode for protection again accidental connectivity. In this mode, the local SM 201 can handle an accidental connectivity where the remote end of the link 204 has an SMA 205 that is protected by an un-known M_Key value 212. For example, the remote SM 202 can be part of another fabric B 220, and the link 204 that connects the local SM 201 to the remote port 203, by mistake. The remote SM 202 in the fabric B 220 can initiate a communication with the local SM 201. In such a case, the accidental connectivity will not cause any change of state in the two connected fabrics, fabric A 200 and fabric B 220, since the M_key associated with the fabric B 220 is unknown to the local SM 201, or not consistent with the local SM configuration 210.

In accordance with an embodiment of the invention, the local SM 201 can support SM level graceful handling of inconsistent SMA responses. The local SM 201 can determine that a link 204 is not operational unless the physical link 204 is up and the SMA 205 associated with the remote end 203 of the link 204 is responding correctly to basic operations.

Additionally, the local SM 201 can perform integrity checks on the remote SMA 205. The link may be considered as logically down if the integrity check fails. Then, the local SM 201 can perform additional checks periodically without any dependency on the SM receiving any state change traps from the SMA on either side of the link. On the other hand, if the physical link 204 is down, then the local SM 201 may neither try performing any further discovery 207 beyond the current link, nor attempt to communicate 206 with any SM 202 behind the remote port 203.

Figure 3:
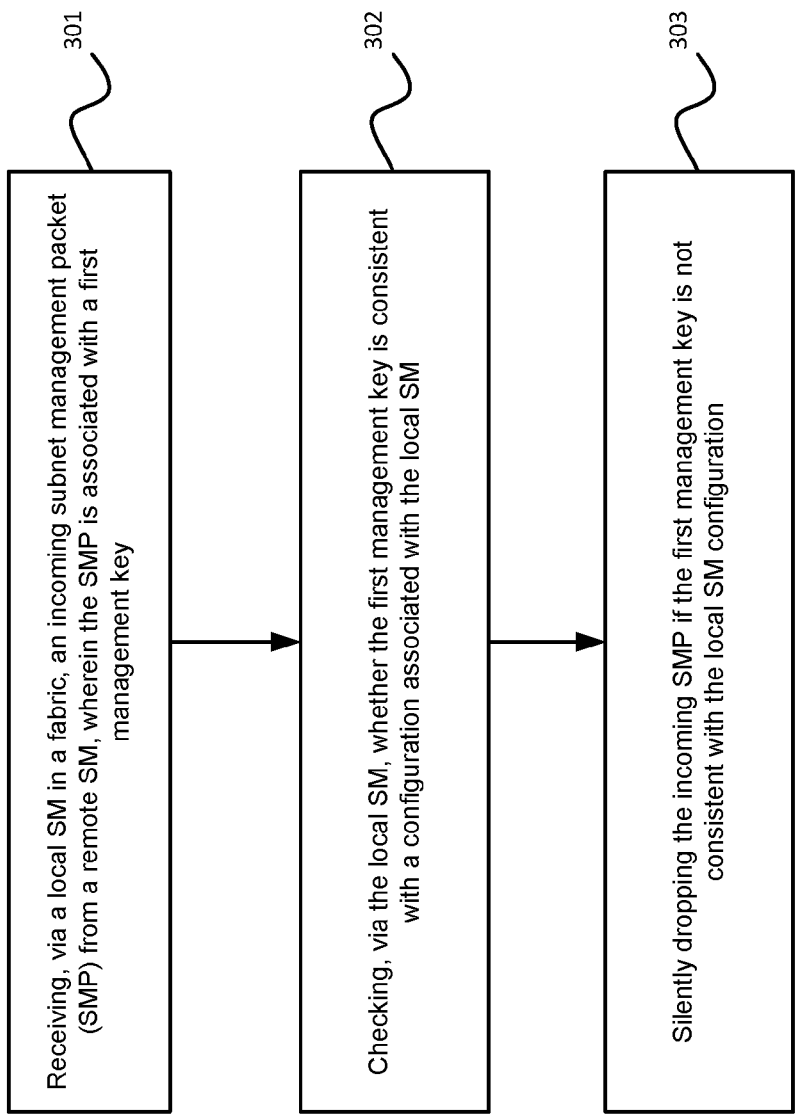
FIG. 3 illustrates an exemplary flow chart for supporting SM level robust handling of an incoming unknown management key in an IB network in accordance with an embodiment of the invention.

FIG. 3 illustrates an exemplary flow chart for supporting SM level robust handling of an incoming unknown management key in an IB network in accordance with an embodiment of the invention. As shown in FIG. 3, at step 301, a local SM in a fabric can receive an incoming SMP from a remote SM, wherein the SMP is associated with a first management key. Then, at step 302, the local SM can check whether the first management key is consistent with a configuration associated with the local SM. Finally, at step 303, the local SM can silently drop the incoming SMP if the first management key is not consistent with the local SM configuration.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for handling an unknown remote subnet manager (SM) and an incoming unknown management key from the remote subnet manager in an InfiniBand (IB) network fabric operating on one or more microprocessors, comprising:
    detecting, by a local SM of a first IB network fabric, a connection of a remote port of a second IB network fabric to the first IB network fabric, wherein the local SM is associated with a first M_Key, wherein the remote port is associated with a subnet management agent (SMA) and is managed by a remote SM of the second IB network fabric, wherein the remote SM of the second IB fabric is associated with a second M_Key different from the first M_Key, wherein the remote SM of the second IB network fabric is positioned behind the remote port in the second IB network fabric, and wherein the connection of the remote port of the second IB network fabric is a physical link to a local port of the first IB network fabric that is managed by the local SM of the first IB network fabric;
    receiving, by the local SM of the first IB network fabric, an incoming subnet management packet (SMP) from the remote SM of the second IB network fabric, the incoming SMP including the second M_Key associated with the second SM of the second I B network fabric;
    determining, by the local SM of the first IB network fabric, that the second M_Key included in the received SMP from the remote subnet is inconsistent with a configuration of the local SM of the first IB network fabric by comparing the second M_Key with a list of M_Keys in a configuration file of the local SM;
    dropping the received SMP based on the determined inconsistency of the second M_Key with the configuration of the local SM of the first IB network fabric;
    preventing the initiation of subnet management packet (SMP) communication from the local SM of the first IB network fabric to the remote port of the second IB network fabric based on the determined inconsistency of the second M_Key with the configuration of the local SM of the first IB network fabric;
    preventing subnet-discovery operation attempts by the local SM of the first IB network fabric over the link to the remote port of the second IB network fabric based on the determined inconsistency of the second M_Key with the configuration of the local SM of the first IB network fabric;
    subsequent to determining the inconsistency of the second M_Key, periodically performing, by the local subnet manager of the first IB network fabric and without dependency on receipt of state-change traps from the SMA associated with the remote port, integrity checks on the SMA associated with the remote port;
    determining that the integrity checks have failed; and
    configuring, by the local SM of the first IB network fabric, and in response to the determined failure of the integrity checks, the local port to treat the physical link connecting the local port to the remote port as logically down, wherein, while the local port is treated as logically down, the local SM does not receive or evaluate any subnet-level communications sent from the remote port.

2. The method according to claim 1, further comprising: determining, via the local SM, whether the remote SM is authorized to communicate with the local SM.

3. The method according to claim 2, further comprising: using subnet SMP based authentication protocols to verify an identity of the remote SM.

4. The method according to claim 1, further comprising: determining that the link is operational when the link is up and the subnet management agent (SMA) associated with a remote port is responding correctly to said periodic integrity checks.

5. The method according to claim 1, wherein the remote SM can initiate communication with the local SM.

6. A non-transitory machine readable storage medium comprising instructions for handling an unknown remote subnet manager (SM) and an incoming unknown management key from the remote subnet manager in InfiniBand (IB) network fabrics, said instructions, when executed by one or more microprocessors, causing the one or more microprocessors to perform the steps comprising:
    detecting, by a local SM of a first IB network fabric, a connection of a remote port of a second IB network fabric to the first IB network fabric, wherein the local SM is associated with a first M_Key, wherein the remote port is associated with a subnet management agent (SMA) and is managed by a remote SM of the second IB network fabric, wherein the remote SM of the second IB fabric is associated with a second M_Key different from the first M_Key, wherein the remote SM of the second IB network fabric is positioned behind the remote port in the second IB network fabric, and wherein the connection of the remote port of the second IB network fabric is a physical link to a local port of the first IB network fabric that is managed by the local SM of the first IB network fabric;
    receiving, by the local SM of the first IB network fabric, an incoming subnet management packet (SMP) from the remote SM of the second IB network fabric, the incoming SMP including the second M_Key associated with the second SM of the second IB network fabric;

determining, by the local SM of the first IB network fabric, that the second M_Key included in the received SMP from the remote subnet is inconsistent with a configuration of the local SM of the first IB network fabric by comparing the second M_Key with a list of M_Keys in a configuration file of the local SM;

dropping the received SMP based on the determined inconsistency of the second M_Key with the configuration of the local SM of the first IB network fabric;

preventing the initiation of subnet management packet (SMP) communication from the local SM of the first IB network fabric to the remote port of the second IB network fabric based on the determined inconsistency of the second M_Key with the configuration of the local SM of the first IB network fabric;

preventing subnet-discovery operation attempts by the local SM of the first IB network fabric over the link to the remote port of the second IB network fabric based on the determined inconsistency of the second M_Key with the configuration of the local SM of the first IB network fabric;

subsequent to determining the inconsistency of the second M_Key, periodically performing, by the local subnet manager of the first IB network fabric and without dependency on receipt of state-change traps from the SMA associated with the remote port, integrity checks on the SMA associated with the remote port;

determining that the integrity checks have failed; and configuring, by the local SM of the first IB network fabric, and in response to the determined failure of the integrity checks, the local port to treat the physical link connecting the local port to the remote port as logically down, wherein, while the local port is treated as logically down, the local SM does not receive or evaluate any subnet-level communications sent from the remote port.

7. The non-transitory machine readable storage medium according to claim 6, further comprising:
determining, via the local SM, whether the remote SM is authorized to communicate with the local SM.

8. The non-transitory machine readable storage medium according to claim 7, further comprising:
using subnet SMP based authentication protocols to verify an identity of the remote SM.

9. The non-transitory machine readable storage medium according to claim 6, further comprising:
determining that the link is operational when the link is up and the subnet management agent (SMA) associated with a remote port is responding correctly to said periodic integrity checks.

10. The non-transitory machine readable storage medium according to claim 6, wherein the remote SM can initiate communication with the local SM.

11. A system for handling an unknown remote subnet manager (SM) and an incoming unknown management key from the remote subnet manager in an InfiniBand (IB) network fabric, comprising:
a computer including memory and one or more microprocessors; and
a local subnet manager (SM), in a first IB network fabric, and executing on the one or more microprocessors, that includes a configuration file with a list of management keys, and wherein the local SM is associated with a first M_Key;
wherein the local SM of the first IB network fabric operates to:

detect a connection of a remote port of a second IB network fabric to the first IB network fabric, wherein the remote port is associated with a subnet management agent (SMA) and is managed by a remote SM of the second IB network fabric, wherein the remote SM of the second IB network fabric is associated with a second M_Key different from the first M_Key, wherein the remote SM of the second IB network fabric is positioned behind the remote port in the second IB network fabric, and wherein the connection of the remote port is a physical link to a local port of the first IB network fabric that is managed by the local SM of the first IB network fabric;

receive an incoming subnet management packet (SMP) from the remote SM of the second IB network fabric, the incoming SMP including the second M_Key associated with the second SM of the second IB network fabric;

determine that the second M_Key included in the received SMP from the remote subnet is inconsistent with a configuration of the local SM of the first IB network fabric by comparing the second M_Key with a list of M_Keys in a configuration file of the local SM;

drop the received SMP based on the determined inconsistency of the second M_Key with the configuration of the local SM of the first IB network fabric;

prevent the initiation of subnet management packet (SMP) communication from the local SM of the first IB network fabric to the remote port of the second IB network fabric based on the determined inconsistency of the second M_Key with the configuration of the local SM of the first IB network fabric;

prevent subnet-discovery operation attempts by the local SM of the first IB network fabric over the link to the remote port of the second IB network fabric based on the determined inconsistency of the second M_Key with the configuration of the local SM of the first IB network fabric;

subsequent to the determination of the inconsistency of the second M_Key, periodically perform, without dependency on receipt of state-change traps from the SMA associated with the remote port, integrity checks on the SMA associated with the remote port;

determine that the integrity checks have failed; and configure, in response to the determined failure of the integrity checks, the local port to treat the physical link connecting the local port to the remote port as logically down, wherein, while the local port is treated as logically down, the local SM does not receive or evaluate any subnet-level communications sent from the remote port.

12. The system according to claim 11, wherein the local SM operates to determine whether the remote SM is authorized to communicate with the local SM.

13. The system according to claim 12, wherein the local SM operates to use subnet SMP based authentication protocols to verify an identity of the remote SM.

14. The system according to claim 11, wherein the local SM operates to determine that the link is operational when the link is up and the subnet management agent (SMA) associated with a remote port is responding correctly to said periodic integrity checks.

15. The system according to claim 11, wherein the remote SM can initiate communication with the local SM.

* * * * *

UNITED STATES PATENT AND TRADEMARK OFFICE
CERTIFICATE OF CORRECTION

PATENT NO. : 9,935,848 B2  
APPLICATION NO. : 13/488192  
DATED : April 3, 2018  
INVENTOR(S) : Johnsen et al.

Page 1 of 1

It is certified that error appears in the above-identified patent and that said Letters Patent is hereby corrected as shown below:

On the Title Page

In Column 1, item (54), under Title, Line 3, delete "UNKOWN" and insert -- UNKNOWN --, therefor.

In the Specification

In Column 1, Line 3, delete "UNKOWN" and insert -- UNKNOWN --, therefor.

In Column 1, Line 39, delete "13/488,040titled" and insert -- 13/488,040, titled --, therefor.

In Column 1, Line 49, delete "etal.," and insert -- et al., --, therefor.

In Column 2, Line 3, delete "Forschungszcntrum" and insert -- Forschungszentrum --, therefor.

In the Claims

In Column 7, Line 58, in Claim 1, delete "I B" and insert -- IB --, therefor.

Signed and Sealed this  
Twenty-third Day of February, 2021

Drew Hirshfeld  
*Performing the Functions and Duties of the*  
*Under Secretary of Commerce for Intellectual Property and*  
*Director of the United States Patent and Trademark Office*